3,553,190
PHENYL-AZO-PHENYL DYESTUFFS
Catherine Margaret Anderton, Brian Ribbons Fishwick, and John Lawson, Manchester, England, assignors to Imperial Chemical Industries Limited, London, England, a corporation of Great Britain
No Drawing. Filed July 12, 1967, Ser. No. 652,705
Claims priority, application Great Britain, July 15, 1966, 31,920/66
Int. Cl. C07c 107/06; C09b 29/06
U.S. Cl. 260—207          3 Claims

ABSTRACT OF THE DISCLOSURE

Water-insoluble azo dyestuffs derived from a diazo component, particularly of the benzene series, and as coupling component, an optionally substituted N-[(alkoxy-alkoxycarbonyl)alkylene]aniline, and the use of the said dyestuffs for coloring synthetic textile materials.

---

This invention relates to azo dyestuffs, and more particularly it relates to water-insoluble azo dyestuffs which are valuable for colouring synthetic textile materials in particular aromatic polyester textile materials.

According to the invention there are provided the water-insoluble azo dyestuffs of the formula:

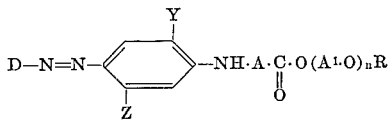

wherein D is the radical of a diazo component, A and A¹ are each independently lower alkylene radicals, R is a lower alkyl radical, Y is hydrogen, lower alkyl, lower alkoxy, carbonamido, chlorine or bromine, Z is hydrogen, lower alkyl, lower alkoxy, chlorine, bromine or trifluoromethyl, and $n$ is 1, 2 or 3.

The lower alkylene radicals represented by A and A¹ are alkylene radicals containing from 1 to 4 carbon atoms, such as methylene, trimethylene, propylene, tetramethylene, and, above all, ethylene radicals.

Throughout this specification the terms "lower alkyl" and "lower alkoxy" are used to denote alkyl and alkoxy radicals respectively containing from 1 to 4 carbon atoms such as methyl, ethyl, n-propyl, iso-propyl, n-butyl, sec-butyl, tert-butyl, methoxy, ethoxy, iso-propoxy, n-propoxy, n-butoxy, sec-butoxy and tert-butoxy radicals.

The radical of the diazo component represented by D is preferably the radical of a diazo component of the naphthalene, thiazole, benzthiazole, thiadiazole, thiophene, and, above all, benzene series. If desired the radical represented by D can contain another azo group or groups, so that the azo dyestuffs of the invention are monoazo or polyazo dyestuffs. It is however preferred that the dyestuffs of the invention are monoazo dyestuffs, and particularly the dyestuffs wherein D is the radical of a diazo component of the benzene series.

It is preferred that $n$ represents 1.

According to a further feature of the invention there is provided a process for the manufacture of the water-insoluble azo dyestuffs, as hereinbefore defined, which comprises coupling a diazotised primary amine of the formula DNH₂ with a coupling component of the formula:

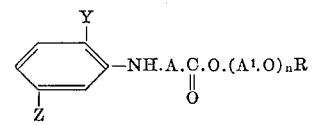

Formula I wherein A, A¹, D, R, Z, Y and $n$ have the meanings stated above, provided that the amine and coupling component are free from sulphonic and carboxylic acid groups.

The process of the invention may be conveniently brought about by adding an aqueous solution or suspension of the diazotised primary amine to a solution of the coupling component in a dilute aqueous solution of an acid such as hydrochloric acid or in a water-soluble organic liquid such as acetone, stirring the resulting mixture, preferably at a pH between 1 and 4, to effect formation of the monoazo dyestuff, and finally isolating the monoazo dyestuff by conventional methods.

The diazotised primary amines of the formula DNH₂ used in the process of the invention are preferably diazotised primary amines of the naphthalene, thiazole, benzthiazole, thiadiazole, thiophene and, above all, benzene series, which optionally contain azo groups.

As specific examples of the primary amines of the benzene series there may be mentioned aniline, o-, m- or p-toluidine, o-, m- or p-anisidine, o-, m- or p-chloroaniline, o-, m- or p-bromoaniline, o-, m- p-nitroaniline, 2:5-dichloroaniline, 2:4-dinitroaniline, 2:4-dinitro - 6 - (chloro or bromo)aniline, 4 - methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6 - di(chloro- or bromo)-4-nitroaniline, 2:4:6-trinitroaniline, 2:4 - dinitro-6-carbomethoxyaniline, 2-amino-5 - nitrobenzotrifluoride, 2:4-bis(methanesulphonyl)aniline, 2-(chloro- or bromo-) 4- nitroaniline, methylanthranilate, 4- or 5-nitromethylanthranilate, 4 - aminobenzamide, 2:6 - di(chloro- or bromo-)-aniline - 4 - sulphonamide, 2:6 - di(chloro- or bromo-)-4-methylsulphonylaniline, 2:5 - di(chloro- or bromo-) - 4:6 - dinitroaniline, 2 - amino-3:5 - dinitrobenzotrifluoride, 3 - amino - 2 - (chloro- or bromo)-4:6-dinitro-(toluene or anilisole), 3 - amino - 4-(chloro- or bromo-)-2:6-dinitro-(toluene or anisole), 2- or 4-cyanoaniline, 4-nitro-2-cyanoaniline, 2:4 - dinitro - 6 - cyanoaniline, 2-nitro-4-cyanoaniline, 2-chloro-4 - cyanoaniline, 3-amino-2:4:6 - trinitrotoluene, 2-(chloro- or bromo-)-4-methylsulphonylaniline, 2-(chloro- or bromo-)-4 - thiocyanatoaniline, 2-(chloro- or bromo-)-4- sulphamylaniline, 2-amino - 5 - nitrophenylmethylsulphone, 2 - amino- 3:5-dinitrophenylmethylsulphone, 2-amino-3-(chloro- or bromo-)-5-nitrophenylmethylsulphone, 2-sulphamyl-4-nitroaniline, 2-methylsulphamyl - 4 - nitroaniline, 2-ethylsulphamyl - 4 - nitroaniline, 2-butylsulphamyl - 4 - nitroaniline, 2 - dimethylsulphamyl - 4-nitroaniline, 2-methylsulphamyl-4:6-dinitroaniline, 2-methylsulphamyl - 4 -nitro-6-(chloro- or bromo-)-aniline, 2-phenylsulphampyl-4-nitroaniline, methyl 2-amino-3-(chloro- or bromo-)-5-nitrobenzoate, methyl 2-amino - 3:5-dinitrobenzoate, dimethyl - 2 - aminoterephthalate, dimethyl 2-amino-5-nitroterephthalate, 4-aminoazo benzene, 4-amino-2:5-dimethoxyazobenzene, and 4'-nitro-4-amino-2-methylazobenzene.

As specific examples of the primary amines of the naphthalene series there may be mentioned 1-naphthylamine-4-sulphonamide, 4 - methylsulphonyl-1-naphthylamine, 6-(N-methylsulphamyl)-2-naphthylamine and 4-phenylazo-1-naphthylamine.

As specific examples of the primary amines of the thiazole series there may be mentioned 2-aminothiazole, 5-nitro-2-aminothiazole, 4 - methyl-5-nitro-2-aminothiazole, 4-phenyl-5-nitro-2-aminothiazole and 2-amino-5-methylsulphonylthiazole.

As specific examples of the primary amines of the benzthiazole series there may be mentioned 2-aminobenzthiazole, 6-(methoxy or ethoxy) - 2 - aminobenzthiazole, 2-amino-6-methylsulphonylbenzthiazole, 2 - amino-6-nitrobenzthiazole, 2-amino - 6 - thiocyanatobenzthiazole, 2-amino-6-cyanobenzthiazole and 2 - amino-6-($\beta$-hydroxyethylsulphonyl)-benzthiazole.

As specific examples of the primary amines of the thiadiazole series there may be mentioned 2-amino-5-methyl-1:3:4-thiadiazole, 2-amino-5-phenyl-1:3:4-thiadiazole, 5-amino-3-phenyl - 1:2:4 - thiazole and 5-amino-3-methyl-1:2:4-thiadiazole.

As specific examples of the primary amines of the thiophene series there may be mentioned 2-amino-3-nitro-5-acetylthiophene and 2-amino-3-nitro-5-benzoylthiophene.

The coupling components of Formula I may themselves be obtained by condensing the appropriate primary amine of the formula

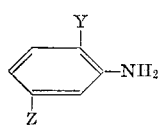

with one molecular proportion of an acid of the formula: Cl.A.COOH or the appropriate $\alpha$:$\beta$-unsaturated carboxylic acid, and esterifying the resulting compound of the formula:

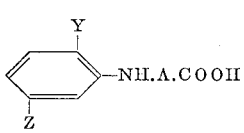

with an alcohol of the formula: HO.(A$^1$.O)$_n$R in the presence of sulphuric acid at a temperature between 60° and 120° C.

As specific examples of the coupling components of Formula I there may be mentioned 2-chloro-5-methyl-N-[$\beta$-($\beta'$-methoxyethoxycarbonyl)ethyl]aniline, 2-methoxy-5 - methyl-N-[$\beta$-($\beta'$ - methoxyethoxycarbonyl)ethyl]aniline and 2-chloro - N - [$\beta$-($\beta'$-methoxyethoxycarbonyl)ethyl]aniline.

According to a further feature of the invention there is provided an alternative process for the manufacture of the azo dyestuffs of the invention which comprises reacting an azo compound of the formula:

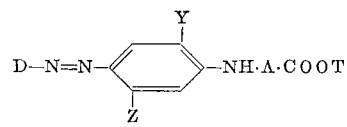

Formula II with an alcohol of the formula: HO.(A$^1$O)$_n$R wherein A, A$^1$, n, D, Y, R and Z have the meanings stated, and T represents hydrogen or lower alkyl.

This process can be conveniently brought about by heating the reactants together in the presence of an esterification or trans-esterification catalyst, such as sulphuric acid. The resulting dyestuffs can then be isolated by conventional methods for example by pouring the reaction mixture into water and filtering off the precipitated dyestuff.

As examples of the said alcohols there may be mentioned $\beta$-methoxyethanol, $\beta$-ethoxyethanol, $\beta$-($\beta'$-methoxyethoxy)ethanol and $\beta$-[$\beta'$-($\beta''$-ethoxyethoxy)ethoxy]ethanol.

The azo compounds of Formula II may themselves be obtained by coupling a diazotised amine of the formula D—NH$_2$ with a coupling component of the formula:

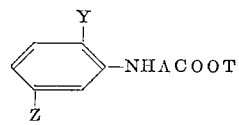

One preferred class of the azo dyestuffs of the invention comprises the water-insoluble monoazo dyestuffs of the formula:

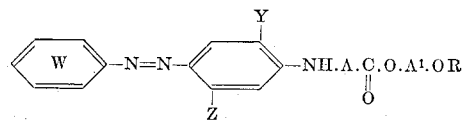

wherein A, A$^1$, R, Y and Z have the meanings stated, and the benzene ring W is optionally substituted by one or more chlorine or bromine atoms, or nitro, cyano, lower alkyl, lower alkoxy, lower alkylsulphonyl, carbo lower alkoxy, carbonamido, N-substituted carbonamido, sulphonamido, N-substituted sulphonamido or trifluoromethyl groups.

A second preferred class of the azo dyestuffs of the invention comprises the monoazo dyestuffs of the formula:

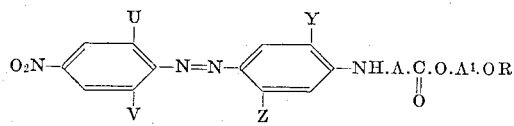

wherein A, A$^1$, R, Y and Z have the meanings stated, U represents hydrogen, cyano, nitro, carbo lower alkoxy, bromine, chlorine, trifluoromethyl or lower alkyl sulphonyl, and V represents hydrogen, chlorine, bromine or nitro.

A third preferred class of the azo dyestuffs of the invention comprises the monoazo dyestuffs of the formula:

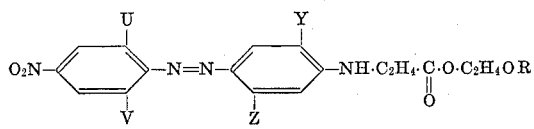

wherein R, U, V, Y and Z have the meanings stated.

A fourth preferred class of the azo dyestuffs of the invention comprises the monoazo dyestuffs of the formula:

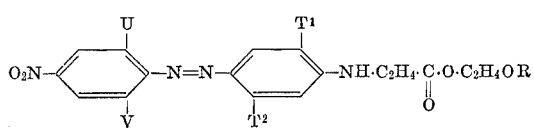

wherein R, U and V have the meanings stated, and one of $T^1$ and $T^2$ represents hydrogen, lower alkoxy or lower alkyl, and the other represents lower alkyl or lower alkoxy.

The water-insoluble azo dyestuffs of the invention are valuable for colouring synthetic textile materials, for example cellulose acetate and cellulose triacetate textile materials, polyamide textile materials such as polyhexamethyleneadipamide textile materials, polyacrylonitrile textile materials and preferably aromatic polyester textile materials such as polyethylene terephthalate textile materials. Such textile materials can be in the form of threads, yarn, or woven or knitted fabric. If desired the said synthetic textile materials can be in the form of blends with other textile materials, for example blends of polyester textile materials with cellulose or woollen textile materials.

Such textile materials can conveniently be coloured with the water-insoluble azo dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C. under superatmospheric pressure.

Alternatively the aqueous dispersion of the said azo dyestuff an be applied to the textile material by a padding or printing process, followed by heating at temperatures up to 230° C. depending on the textile material, or by steaming of the textile material. In such processes it is preferred to incorporate a thickening agent, such as gum tragacanth, gum arabic or sodium alginate, into the aqueous dispersion of the said azo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The azo dyestuffs have excellent affinity and building up properties on synthetic textile materials, and in particular on aromatic polyester textile materials, so enabling deep shades to be obtained. The resulting colorations have excellent fastness to light, to wet treatments, and in particular, to dry heat treatments such as those carried out at high temperatures during pleating operations.

If desired the azo dyestuffs of the invention can be applied to synthetic textile materials in conjunction with other disperse dyes.

The invention is illustrated but not limited by the following examples in which the parts and percentages are by weight.

EXAMPLE 1

2.08 parts of 2-cyano-4:6-dinitroaniline are gradually added to a solution of nitrosylsulphuric acid, which is obtained by adding 0.7 part of sodium nitrite to 8 parts of sulphuric acid monohydrate at a temperature below 35° warming to 70° C. and then cooling, at a temperature between 0° and 5° C. 15 parts of phosphoric acid are then added and the mixture stirred for 1 hour at 0° to 5° C.

The resulting solution of the diazo compound is gradually added with stirring, to a solution of 2.67 parts of 2 - methoxy-5-methyl-N-[$\beta$-($\beta'$-methoxyethoxycarbonyl) ethyl]-aniline and 1 part of urea in 200 parts of acetone, whilst ice is simultaneously added to maintain the temperature of the mixture at 0° to 5° C. 500 parts of water are added, the mixture is stirred for ½ hour, and the precipitated dyestuff is filtered off, washed with water and dried.

When dispersed in aqueous medium the dyestuff so obtained dyes aromatic polyester textile materials in blue shades having excellent fastness to light.

EXAMPLE 2

A solution of 0.7 part of sodium nitrite in 50 parts of water is added to a solution of 1.38 parts of p-nitroaniline in 10 parts of a concentrated aqueous solution of hydrochloric acid, and the mixture is stirred for 30 minutes at 0° to 5° C. The mixture is then filtered, and sulphamic acid is added to the filtrate to destroy any nitrous acid present. The resulting solution of the diazo compound is gradually added, with stirring, to a solution of 2.71 parts of 2-chloro-5-methyl-N-[$\beta$-($\beta'$-methoxyethoxycarbonyl) ethyl]aniline in 200 parts of acetone, whilst ice is simultaneously added to maintain the temperature between 0° and 5° C. The mixture is stirred for 30 minutes and the precipitated dyestuff is then filtered off, washed with water and dried.

When dispersed in aqueous medium the dyestuff so obtained dyes aromatic polyester textile material in scarlet shades of excellent fastness to light.

The following table gives further examples of the water-insoluble azo dyestuffs of the invention having the formula:

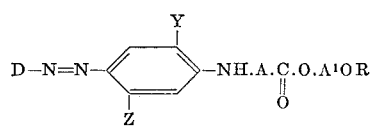

the symbols of which have the values given in the respective columns of the table, and the shades of the dyeings obtained from the said dyestuffs are given in the last column of the table.

The said dyestuffs may be obtained by diazotising the appropriate amines of the formula $D-NH_2$ and coupling the resulting diazo compounds with the appropriate coupling components using methods similar to those described in Examples 1 and 2.

| Example | D | Y | Z | A | A¹ | R | Shade |
|---|---|---|---|---|---|---|---|
| 3 | 2-chloro-4-nitroaniline | Chlorine | Methyl | Ethylene | Ethylene | Methyl | Scarlet. |
| 4 | 2-cyano-4-nitrophenyl | do | do | do | do | do | Red. |
| 5 | 4-nitrophenyl | Methyl | Hydrogen | do | do | do | Scarlet. |
| 6 | 2-chloro-4-nitrophenyl | do | do | do | do | do | Red. |
| 7 | 2-cyano-4-nitrophenyl | do | do | do | do | do | Rubine. |
| 8 | 4-nitrophenyl | Methoxy | Chlorine | do | do | do | Scarlet. |
| 9 | 2-cyano-4-nitrophenyl | do | do | do | do | do | Rubine. |
| 10 | do | Methyl | Methyl | do | do | do | Do. |
| 11 | 4-nitrophenyl | do | do | do | do | do | Scarlet. |
| 12 | 2-bromo-4:6-dinitrophenyl | do | do | do | do | do | Violet. |
| 13 | 4-nitrophenyl | Methyl | Chlorine | Ethylene | Ethylene | Methyl | Scarlet. |
| 14 | 2-cyano-4-nitrophenyl | do | do | do | do | do | Red. |
| 15 | 2-bromo-4:6-dinitrophenyl | Methoxy | Methyl | do | do | do | Violet. |
| 16 | do | do | Methoxy | do | do | do | Do. |
| 17 | 2-ethylsulphonyl-4-nitrophenyl | Chlorine | Methyl | do | do | do | Red. |
| 18 | 2-cyano-4:6-dinitrophenyl | Methoxy | Methoxy | do | do | do | Navy blue. |
| 19 | 2-cyano-4-nitrophenyl | Chlorine | Hydrogen | do | do | do | Scarlet. |
| 20 | do | Bromine | do | do | do | Ethyl | Do. |
| 21 | do | Methoxy | Methyl | do | do | Methyl | Rubine. |
| 22 | 2:6-dichloro-4-nitrophenyl | Chlorine | do | do | do | do | Yellowish-brown. |
| 23 | do | Methoxy | Chlorine | do | do | do | Reddish-brown. |
| 24 | 2:4:5-trichlorophenyl | Chlorine | Methyl | Ethylene | Ethylene | Methyl | Reddish-yellow. |
| 25 | 4-phenylazophenyl | do | do | do | do | do | Orange. |
| 26 | 4-phthalimidophenyl | do | do | do | do | do | Reddish-yellow. |
| 27 | 2-bromo-4-nitro-6-cyanophenyl | do | do | do | do | do | Rubine. |
| 28 | 2-carbonamido-4-nitrophenyl | do | do | do | do | do | Scarlet. |
| 29 | 2-bromo-4-nitro-6-cyanophenyl | Methyl | Hydrogen | do | do | n-Propyl | Violet. |
| 30 | 2-cyano-4-nitrophenyl | Carbonamido | Methyl | do | do | Methyl | Bluish-red. |
| 31 | p-Nitrophenyl | do | do | do | do | do | Scarlet. |
| 32 | 2-carbomethoxy-4-nitrophenyl | Methyl | do | β-Methyl-ethylene | Trimethylene | do | Red. |
| 33 | 2-trifluoromethyl-4-nitrophenyl | do | do | Trimethylene | Ethylene | do | Do. |
| 34 | 2-cyano-4-nitrophenyl | Chlorine | Trifluoromethyl | Ethylene | do | do | Scarlet. |
| 35 | do | Methyl | Bromine | do | do | do | Red. |
| 36 | 2:6-dichloro-4-sulphonamido-phenyl | do | Methyl | do | do | do | Yellow. |
| 37 | 4-sulphonamido-naphth-1-yl | do | do | do | do | do | Red. |

EXAMPLE 38

0.7 part of sodium nitrite is added to 8 parts of sulphuric acid monohydrate at a temperature below 35° C., and the mixture is then warmed to 70° C. and immediately cooled to 0° C. 16 parts of acetic acid and 4 parts of propionic acid are added, followed by a slurry of 2.28 parts of 2-amino-6-methylsulphonylbenzthiazole in a mixture of 24 parts of acetic acid and 8 parts of propionic acid, the temperature of the resulting mixture being maintained below 5° C. by external cooling. The mixture is stirred for 2 hours at 0° to 5° C., and is then gradually added to a solution of 2.71 parts of 2-chloro-5-methyl-N-[β-(β'-methoxyethoxycarbonyl)ethyl]aniline and 1 part of urea in 200 parts of acetone, ice being simultaneously added to maintain the temperature below 5° C. 500 parts of water are added, the mixture is stirred for 30 minutes, and the precipitated dyestuff is then filtered off, washed with water and dried.

An aqueous dispersion of the dyestuff dyes aromatic polyester textile materials in red shades of excellent fastness properties.

Similar dyestuffs are obtained when the 2.28 parts of the amine used in the above example are replaced by equivalent amounts of 2-amino-5-nitrothiazole, 2-amino-5-phenyl-1:3:4-thiadiazole or 2-amino-3-nitro-5-acetylthiophene and/or the 2.71 parts of the coupling component are replaced by equivalent amounts of 2-(methyl or methoxy) - 5 - methyl - N - [β - (β' - methoxyethoxycarbonyl)ethyl]aniline.

EXAMPLE 39

In place of the 1.38 parts of p-nitraniline and the 2.71 parts of the coupling component used in Example 2 there are used respectively 0.93 part of aniline and 3.16 parts of 2 - chloro - 5 - methyl - N - {β-[β'-(β''-methoxyethoxy) ethoxycarbonyl]ethyl}aniline whereby a dyestuff is obtained which dyes aromatic polyester textile materials in yellow shades of excellent fastness properties.

EXAMPLE 40

In place of the 2.08 parts of the amine and the 2.67 parts of the coupling component used in Example 1 there are used respectively 1.63 parts of 2-cyano-4-nitroaniline and 3.55 parts of 2-methoxy-5-methyl-N-(β-[β'-{β''-(β'''-methoxyethoxy) ethoxy} ethoxycarbonyl] ethyl) aniline whereby a dyestuff is obtained which dyes aromatic polyester textile materials in rubine shades of excellent fastness properties.

EXAMPLE 41

A mixture of 15 parts of the azo compound obtained by coupling diazotised 2-cyano-4-nitroaniline with 2-chloro-N-(β-carboxyethyl)aniline, 150 parts of β-methoxyethanol and 1 part of sulphuric acid is stirred for 3 hours at 65° C. to 75° C. The mixture is then poured into 1000 parts of a 1% aqueous solution of sodium bicarbonate, and the precipitated dyestuff is filtered off, washed with water and dried.

The dyestuff so obtained is identical with the dyestuff of Example 19.

We claim:

1. Water-insoluble azo dyestuff of the formula

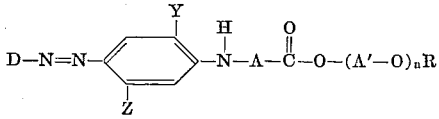

wherein

D is a benzene radical which can be substituted with 1–3 members selected from the group consisting of cyano, nitro, chlorine, bromine, methyl, methoxy, trifluoromethyl, lower alkyl sulphonyl, carbo lower alkoxy, carbonamido and sulphonamido, said benzene radical being directly linked to the azo portion of the dyestuff through a carbon atom in the benzene ring, A and A' are each independently lower alkylene radicals;

R is lower alkyl;

$n$ is a positive integer of 1–3;

Y is selected from the group consisting of hydrogen, lower alkyl, lower alkoxy, carbonamido, chlorine and bromine;

Z is selected from the group consisting of hydrogen, lower alkyl, lower alkoxy, trifluoromethyl, chlorine and bromine.

2. The water-insoluble azo dyestuff of claim 1 having the formula

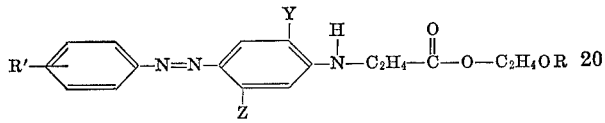

wherein

R' is selected from the group consisting of hydrogen, cyano, nitro, chlorine, bromine, methyl, methoxy, trifloromethyl, lower alkyl sulphonyl, carbo lower alkoxy, carbonamido and sulphonamido;

R is lower alkyl;

Y is selected from the group consisting of hydrogen, lower alkyl, lower alkoxy, carbonamido, chlorine and bromine; and Z is selected from the class consisting of hydrogen, lower alkyl, lower alkoxy, chlorine and bromine.

3. The water-insoluble azo dyestuff of claim 1 having the formula

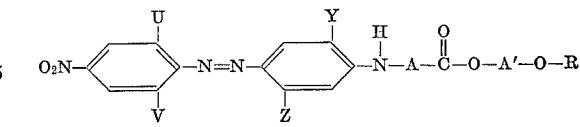

wherein

A and A' are each independently lower alkylene radicals;

R is lower alkyl;

Y is selected from the group consisting of hydrogen, lower alkyl, lower alkoxy, carbonamido, chlorine and bromine; and Z is selected from the group consisting of hydrogen, lower alkyl, lower alkoxy, trifluoromethyl, chlorine and bromine.

U is selected from the group consisting of hydrogen, cyano, nitro, carbo lower alkoxy, bromine, chlorine, trifluoromethyl and lower alkyl sulphonyl; and V is selected from the group consisting of hydrogen, chlorine, bromine and nitro.

References Cited
UNITED STATES PATENTS
3,097,198   7/1963   Fishwick et al. ____ 260—207.1

JOSEPH P. BRUST, Primary Examiner

C. F. WARREN, Assistant Examiner

U.S. Cl. X.R.

8—41, 50; 260—152, 158, 187, 196, 207.1